(12) United States Patent
Kumar et al.

(10) Patent No.: US 12,437,825 B2
(45) Date of Patent: Oct. 7, 2025

(54) AT-SPEED TRANSITION FAULT TESTING FOR A MULTI-PORT AND MULTI-CLOCK MEMORY

(71) Applicant: STMicroelectronics International N.V., Geneva (CH)

(72) Inventors: Tanuj Kumar, Noida (IN); Hitesh Chawla, Noida (IN); Bhupender Singh, New Delhi (IN); Harsh Rawat, Haryana (IN); Kedar Janardan Dhori, Ghaziabad (IN); Manuj Ayodhyawasi, Noida (IN); Nitin Chawla, Noida (IN); Promod Kumar, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 267 days.

(21) Appl. No.: 18/228,118

(22) Filed: Jul. 31, 2023

(65) Prior Publication Data
US 2024/0112748 A1 Apr. 4, 2024

Related U.S. Application Data

(60) Provisional application No. 63/411,683, filed on Sep. 30, 2022.

(51) Int. Cl.
*G11C 29/12* (2006.01)
*G11C 29/32* (2006.01)

(52) U.S. Cl.
CPC .... *G11C 29/1201* (2013.01); *G11C 29/12015* (2013.01); *G11C 29/32* (2013.01); *G11C 2029/1204* (2013.01)

(58) Field of Classification Search
CPC .......... G11C 29/1201; G11C 29/12015; G11C 29/32; G11C 2029/1204; G11C 29/02; G11C 29/48
See application file for complete search history.

(56) References Cited

U.S. PATENT DOCUMENTS

| | | | |
|---|---|---|---|
| 7,266,021 B1* | 9/2007 | Vinke | G11C 7/12 365/189.08 |
| 9,003,255 B2 | 4/2015 | Kohli | |
| 9,069,042 B2 | 6/2015 | Raina et al. | |
| 9,263,100 B2 | 2/2016 | Garni et al. | |
| 10,650,906 B2 | 5/2020 | Barth, Jr. et al. | |
| 11,073,553 B2 | 7/2021 | Pradeep et al. | |
| 2004/0233150 A1* | 11/2004 | Guttag | G09G 5/10 345/87 |
| 2022/0164297 A1* | 5/2022 | Sity | G06F 12/1458 |

\* cited by examiner

*Primary Examiner* — Mohammed A Bashar
(74) *Attorney, Agent, or Firm* — Crowe & Dunlevy LLC (57) ABSTRACT

A memory circuit includes an address port, a data input port and a data output port. An upstream shadow logic circuit is coupled to provide address data to the address port of the memory circuit and input data to the data input port of the memory circuit. A downstream shadow logic circuit is coupled to receive output data from the data output port of the memory circuit. The memory circuit includes a bypass path between the address port and the data output port. This bypass path is activated during a testing operation to pass bits of the address data (forming test data) applied by upstream shadow logic circuit from the address port to the data output port.

40 Claims, 9 Drawing Sheets

FIG. 12

AT-SPEED TRANSITION FAULT TESTING FOR A MULTI-PORT AND MULTI-CLOCK MEMORY

CROSS REFERENCE TO RELATED APPLICATIONS

This application claims priority to U.S. Provisional Application for Patent No. 63/411,683, filed Sep. 30, 2022, the disclosure of which is incorporated herein by reference.

TECHNICAL FIELD

Embodiments herein relate to testing an integrated circuit and, in particular, to the testing of an integrated circuit including shadow logic and a multi-port and multi-clock memory for at-speed transition faults.

BACKGROUND

Complex integrated circuits include a combination of non-logic circuits (such as memory circuits, analog circuits) surrounded by digital logic circuits. Testing of the integrated circuits is a requirement. It is known in the art to use built-in self test (BIST) mechanisms for the purpose of testing the non-logic circuits. For example, BIST testing is commonly employed for memory testing. However, BIST is not well suited for providing testing coverage of the surrounding digital logic circuits (often referred to in the art as shadow logic). Scan chain testing mechanisms can be used for separately testing the digital logic circuits. However, the testing of digital logic circuits surrounding programmable non-logic circuits remains a challenge, especially in the context of performing at-speed transition fault testing and where the programmable non-logic circuit asynchronously operates in read and write mode.

SUMMARY

In an embodiment, an integrated circuit system comprises: a memory circuit having: a memory array, a control circuit coupled to an address port, and input/output circuits coupled to a data input port and a data output port. The control circuit includes an address register configured to latch a read address in response to a read clock. Each input/output circuit includes a first data path controlled by a write clock and coupling a data input of the data input port to a write bit line of the memory array and a second data path controlled by the read clock and coupling a read bit line of the memory array to a data output of the data output port. The second data path in each input/output circuit comprises a multiplexer circuit having a first input coupled to the read bit line, a second input coupled to a bypass path and an output coupled to the data output. A test bit is applied responsive to the read clock to the second input of the multiplexer in each input/output circuit. The multiplexer is controlled to select the second input during a testing operation.

In an embodiment, an integrated circuit system comprises: a memory circuit having a memory array, a control circuit coupled to an address port, and input/output circuits coupled to a data input port and a data output port. The control circuit includes an address register configured to latch a read address in response to a read clock. Each input/output circuit includes a first data path controlled by a write clock and coupling a data input of the data input port to a write bit line of the memory array and a second data path controlled by the read clock and coupling a read bit line of the memory array to a data output of the data output port. The second data path in each input/output circuit comprises a multiplexer circuit having a first input coupled to the read bit line, a second input coupled to a bypass path and an output coupled to the data output. An address bit of the read address latched in the address register is applied to the second input of the multiplexer in each input/output circuit. The multiplexer is controlled to select the second input during a testing operation.

In an embodiment, an integrated circuit system comprises: a memory circuit an address port, a data input port and a data output port; an upstream shadow logic circuit coupled to provide address data to the address port of the memory circuit and input data to the data input port of the memory circuit; and a downstream shadow logic circuit coupled to receive output data from the data output port of the memory circuit. The memory circuit includes a bypass path between the address port and the data output port, wherein the bypass path is active during a testing operation to pass bits of the address data applied by upstream shadow logic circuit from the address port to the data output port.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
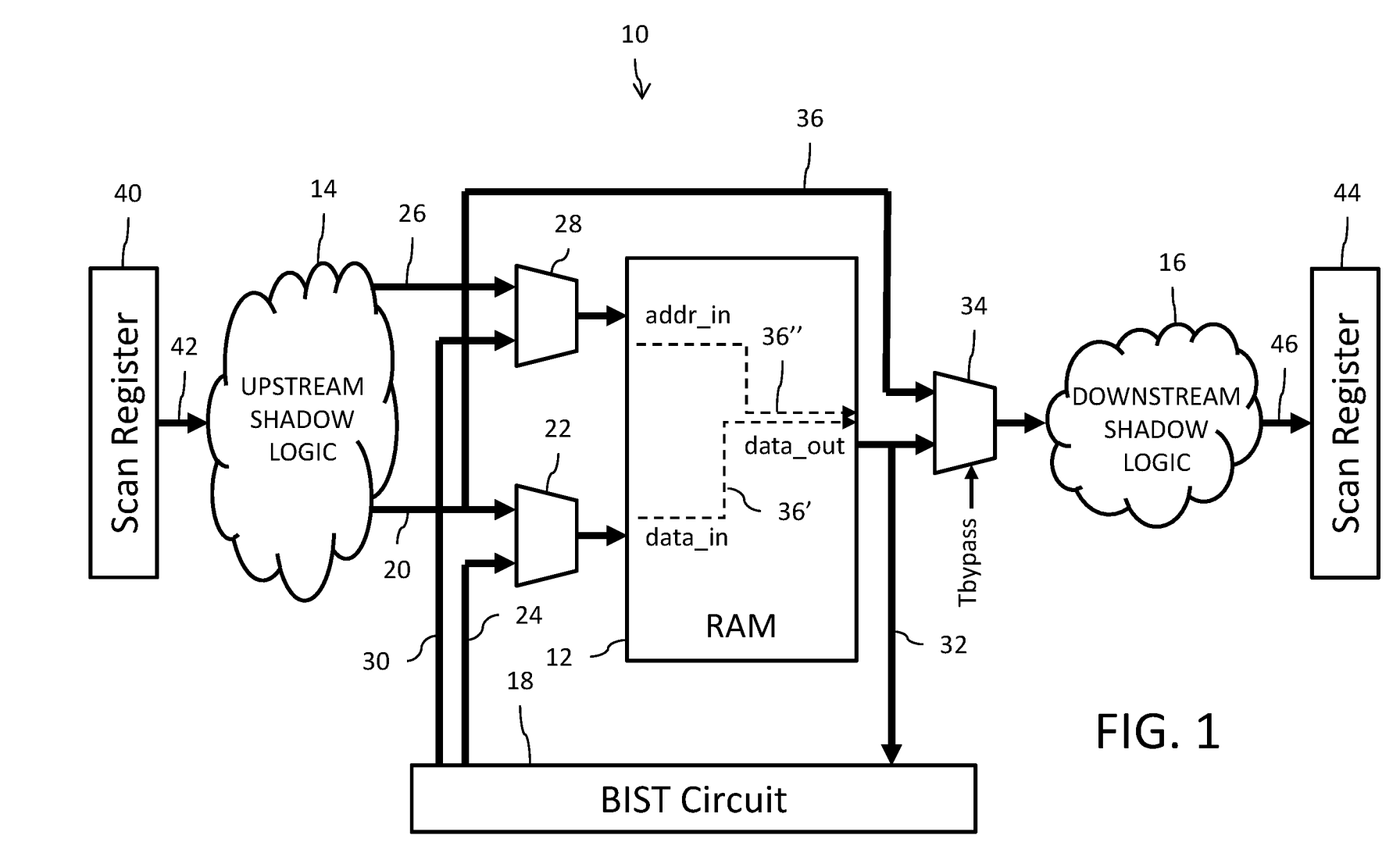
FIG. 1 is a block diagram of an integrated circuit system including a memory circuit.

Reference is made to FIG. 1 which shows a block diagram of an integrated circuit system 10 that includes a memory circuit 12, shown here by example as a form of random access memory (RAM), surrounded by upstream (or input) shadow logic 14 and downstream (or output) shadow logic 16. A memory built-in self test (BIST) circuit 18 is provided to test the memory circuit 12 (noting that testing of the shadow logic 14, 16 is not performed by the BIST circuit 18). The upstream shadow logic 14 is configured to provide a multi-bit data input 20 to the data input port (data_in) of the memory circuit 12 through a first input of a multiplexer 22. The BIST circuit 18 is configured to provide a multi-bit BIST data input 24 to the data input port (data_in) of the memory circuit 12 through a second input of the multiplexer 22. The upstream shadow logic 14 is further configured to provide a multi-bit address input 26 to the address port (addr_in) of the memory circuit 12 through a first input of a multiplexer 28. The BIST circuit 18 is further configured to provide a multi-bit BIST address input 30 to the address port (addr_in) of the memory circuit 12 through a second input of the multiplexer 28. At the data output port (data_out) of the memory circuit 12, a multi-bit data output 32 is provided to the downstream shadow logic 16 through the first input of a multiplexer 34. The multi-bit data output 32 is further applied as feedback to the BIST circuit 18. The multi-bit data input 20 from the upstream shadow logic 14 is further applied over a memory bypass 36 to the downstream shadow logic 16 through the second input of the multiplexer 34. An input scan chain register can provide test data 42 for application to the upstream shadow logic 14. Test data 46 generated by the downstream shadow logic 16 is received by an output scan chain register 44.

As noted above, BIST testing using the BIST circuit 18 is specific to providing for testing of the memory circuit 12. Testing of the upstream shadow logic 14 and downstream shadow logic 16 surrounding the memory circuit 12 is performed using automated test pattern generation (ATPG) circuitry (not explicitly shown) which loads the test data input to the input scan chain register 40 and extracts the test data output from the output scan chain register 44. In order to avoid the complexity of accessing the memory 12 during ATPG controlled logic testing, the memory bypass 36 is enabled by assertion of a test bypass control signal (Tbypass) to permit the multi-bit data input 20 from the upstream shadow logic 14 to avoid (bypass) the memory circuit 12 and be applied to the downstream shadow logic 16 through the second input of the multiplexer 34.

Figure 2:
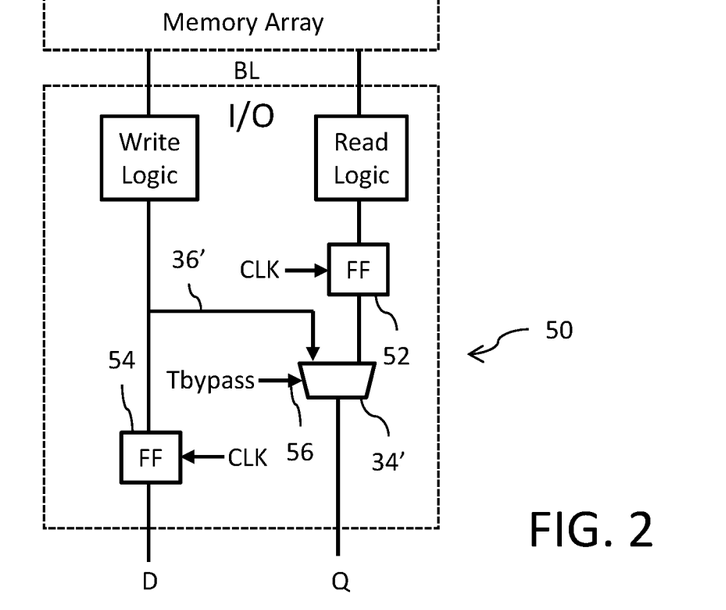
FIG. 2 is a block diagram of an input/output (I/O) circuit for the memory circuit of FIG. 1.

The multiplexer 34 and memory bypass 36 may instead be implemented as part of an input/output (I/O) circuit of the memory circuit 12 between the data input port (data_in) and the data output port (data_out). An example of this is shown in FIG. 2 (see, multiplexer 34' and bypass path 36'). The I/O circuit 50 includes a data input D (as part of the memory data input port data_in) and a data output Q (as part of the memory data output port data_out). A data output latch 52, for example formed by a flip-flop (FF), is coupled to the memory array of the memory circuit 12 to receive the data bit read by read logic circuitry from the memory array through bit lines BL. The data output latch 52 is controlled by a clock signal CLK. Output from the data output latch 52 is applied to the first input of the multiplexer 34' whose output is coupled to the data output Q of the I/O circuit 50. A data input latch 54 is coupled to receive the data bit input to the memory circuit 12 at the data input D. The data input latch 54 is controlled by the clock signal CLK. Output from the data input latch 54 is applied through write logic circuitry to write data into the memory array through the bit lines BL. The output from the data input latch 54 is further applied over a bypass path 36' to the second input of the multiplexer 34' whose output is coupled to the data output Q of the I/O circuit 50. The selection input of the multiplexer 34' receives the test bypass (Tbypass) control signal 56. When the test bypass control signal 56 is asserted (for example, logic high), the multiplexer 34' selects the data at the second input of the multiplexer 34' for output to the data output Q of the I/O circuit 50.

The passing of the data bit input to the memory circuit 12 at the data input D over the bypass path 36' for output from the memory circuit at the data output Q in the memory bypass operation enables stuck-at fault testing coverage for the shadow logic. Furthermore, the timing of data passage from data input D to data output Q over the bypass path 36' can be controlled by a selftime delay which matches the normal memory access time delay (for memory array read/write operations) in order to enable transient fault testing coverage.

It will be noted in this example that the memory array is coupled to the I/O circuits 50 via bit lines BL comprising a complementary pair bit lines where the array is formed by memory bit cells of a single port type. This testing operation becomes more complicated in the scenario where the bit cells of the memory circuit are instead multi-port cells (i.e., with separate read and write ports) and where the memory circuit supports different clocks for read and write timing operations on the different read/write ports.

Figure 3:
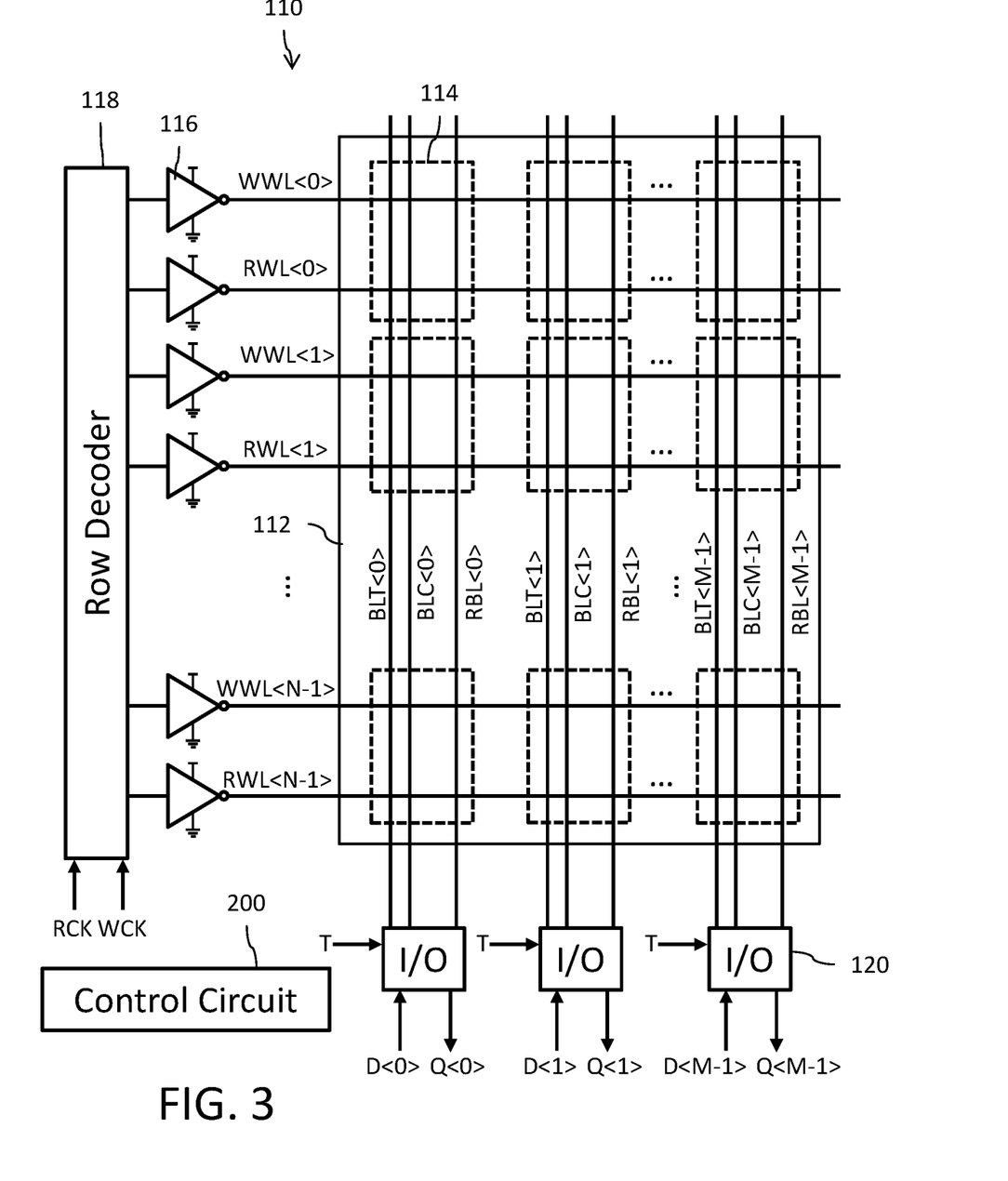
FIG. 3 is a block diagram of a memory circuit.

Reference is now made to FIG. 3 which shows a block diagram of a memory circuit 110 including a static random access memory (SRAM) array 112 formed by a plurality of SRAM memory cells 114 arranged in a matrix format having N rows and M columns. Each SRAM memory cell is of a well-known dual port (one read, one write) 8T-type (see, FIG. 4) and includes a write word line WWL, a pair of complementary (write) bit lines BLT and BLC, a read word line RWL and a read bit line RBL. The SRAM memory cells in a common row of the matrix are connected to each other through a common write word line WWL and through a common read word line RWL. Each of the word lines (WWL and/or RWL) is driven by a word line driver circuit 116 with a word line signal generated by a row decoder circuit 118 during read and write operations. The SRAM memory cells in a common column of the matrix across the whole array 112 are connected to each other through a common pair of complementary bit lines BLT and BLC (corresponding to a write port of each memory cell 114) and through a common read bit line RBL (corresponding to a read port of each memory cell 114). Each of the bit lines (BLT, BLC and RBL) is coupled to a column input/output (I/O) circuit 120. A data input port (D) of the column I/O circuit 120 (provided as part of the memory data input port data_in) receives input data to be written to an SRAM memory cell 114 in the column through the bit lines BLT, BLC in response to assertion of a write word line signal timed by a write clock WCK signal. A data output port (Q) of the column I/O circuit 120 (provided as part of the memory data output port data_out) generates output data read from an SRAM memory cell 114 in the column through the read bit line RBL in response to assertion of a read word line signal timed by a read clock RCK signal. A control circuit 200 controls operations of the circuitry within the memory. It will be noted that the clock signals WCK and RCK can be asynchronous clocks. So, in this configuration, the memory circuit 110 may be referred to as a multi-port (i.e., two-port: one read, one write) and multi-clock (read and write) type memory.

Figure 4:
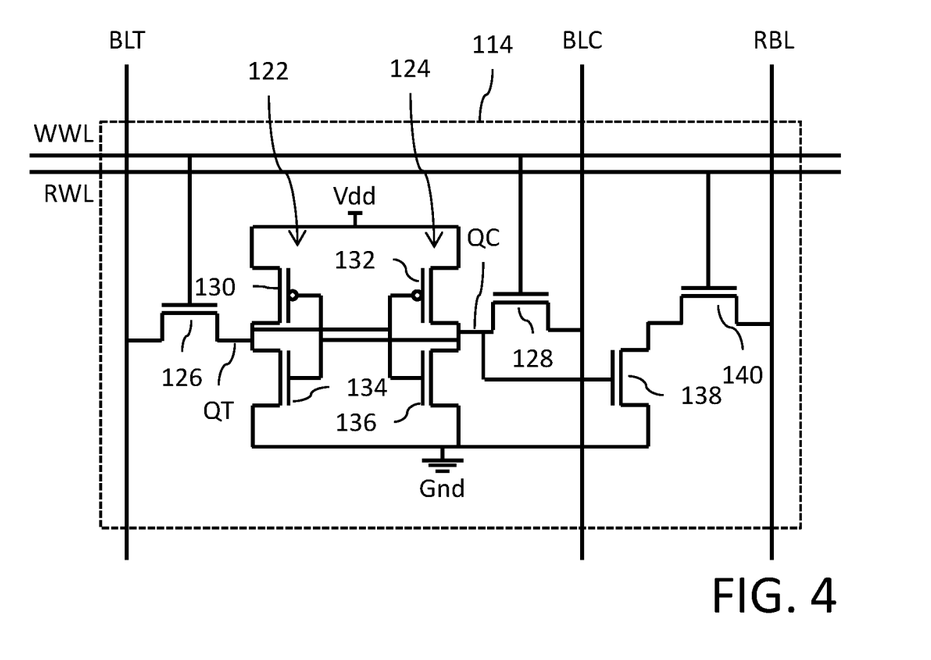
FIG. 4 is a circuit diagram of a standard 8T static random access memory (SRAM) cell as used the memory array shown in FIG. 3.

With reference now to FIG. 4, each memory cell 114 includes two cross-coupled CMOS inverters 122 and 124, each inverter including a series connected p-channel and n-channel MOSFET transistor pair. The inputs and outputs of the inverters 122 and 124 are coupled to form a latch circuit having a true data storage node QT and a complement data storage node QC which store complementary logic states of the stored data bit. The cell 114 further includes two transfer (passgate) transistors 126 and 128 whose gate terminals are driven by a word line WL. The source-drain path of transistor 126 is connected between the true data storage node QT and a node associated with a true bit line BLT. The source-drain path of transistor 128 is connected between the complement data storage node QC and a node associated with a complement bit line BLC. The source terminals of the p-channel transistors 130 and 132 in each inverter 122 and 124 are coupled to receive a high supply voltage (for example, Vdd) at a high supply node, while the source terminals of the n-channel transistors 134 and 136 in each inverter 122 and 124 are coupled to receive a low supply voltage (for example, ground (Gnd) reference) at a low supply node. A signal path between the read bit line RBL and the low supply voltage reference is formed by series coupled transistors 138 and 140. The gate terminal of the (read) transistor 138 is coupled to the complement storage node QC and the gate terminal of the (transfer) transistor 140 is coupled to receive the signal on the read word line RWL. The word line driver circuits 116 are also typically coupled to receive the high supply voltage (Vdd) at the high supply node and is referenced to the low supply voltage (Gnd) at the low supply node.

Figure 5:
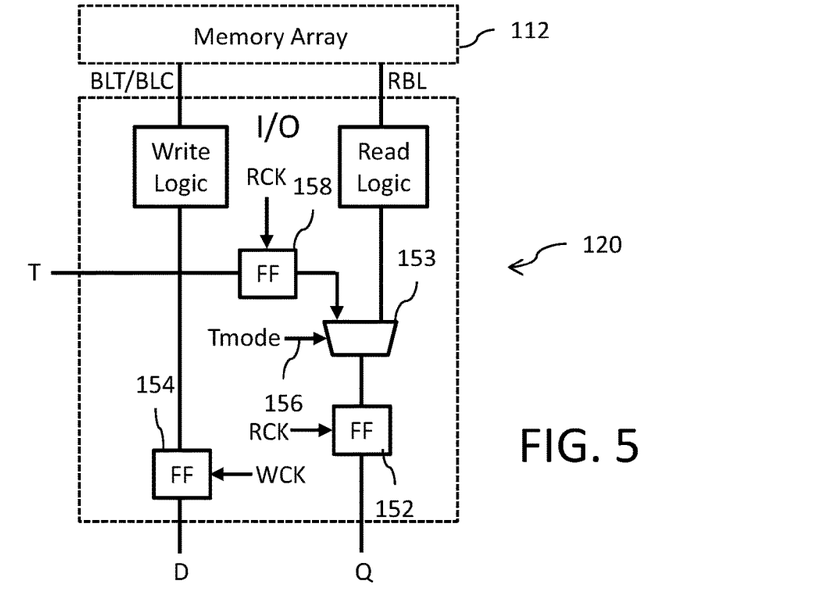
FIG. 5 is a block diagram of the I/O circuit for the memory circuit of FIG. 3.
Figure 6:
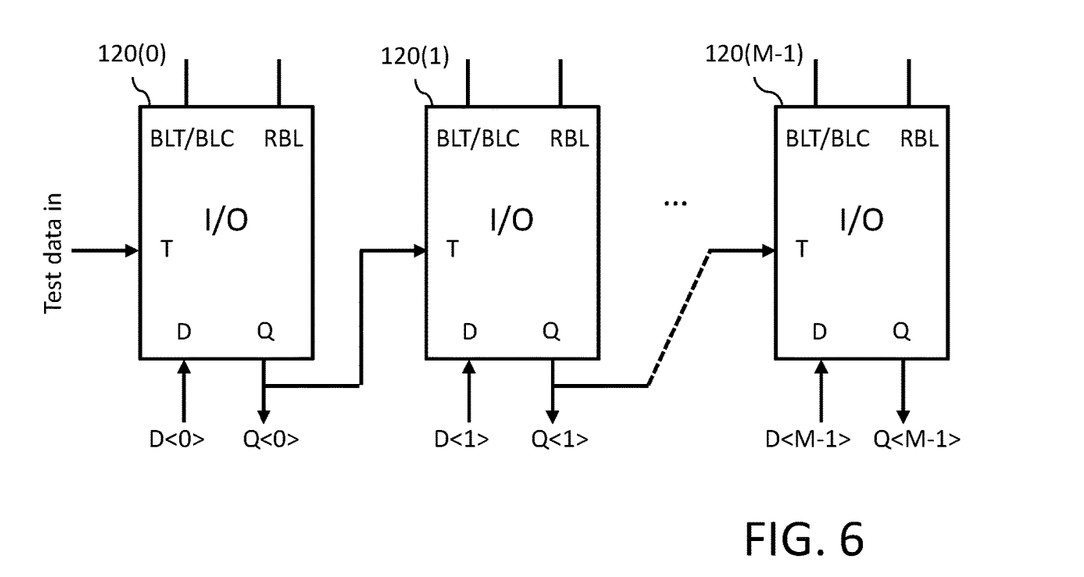
FIG. 6 shows a connection of I/O circuits as shown in FIG. 5 in a scan chain configuration for supporting testing operations.

The memory circuit 110 may, for example, be used as the memory circuit 12 in the system 10 shown in FIG. 1. In support of integrated circuit testing operations, the input/output (I/O) circuit 120 of the memory circuit 110 may have a circuit configuration like that shown in FIG. 5, wherein the M I/O circuits 120(0) to 120(M−1) are connected in a scan chain configuration as shown in FIG. 6. Each I/O circuit 120 includes a data input D (as part of the memory data input port data_in) and a data output Q (as part of the memory data output port data_out). A data output latch 152, for example formed by a flip-flop (FF), is coupled to the memory array of the memory circuit 110 (via column read bit line RBL) through a first input of a multiplexer 153 to receive the data bit read by read logic circuitry from the memory array. The data output latch 152 is controlled by a read clock signal RCK. Output from the data output latch 152 is coupled to the data output Q of the I/O circuit 120. A data input latch 154 is coupled to receive the data bit input to the memory circuit 110 at the data input D. The data input latch 154 is controlled by a write clock signal WCK. Output from the data input latch 154 is applied through write logic circuitry to write data into the memory array (via column complementary write bit lines BLT, BLC). Each I/O circuit 120 further includes a test input T (for example, provided as part of the memory data input port data_in) coupled to receive a test data bit. A test data latch 158 is coupled to receive the test data bit from the test input T. The test data latch 158 is controlled by the read clock signal RCK. The output of the test data latch 158 is coupled to a second input of the multiplexer 153 whose output is coupled to the data output Q of the I/O circuit 120. The selection input of the multiplexer 153 receives a test mode (Tmode) control signal 156. When the test mode control signal 156 is asserted (for example, logic high), the multiplexer 153 selects the data at the second input of the multiplexer 153 (as received from test input T) for output to the data output Q.

For the scan chain configuration in FIG. 6, the test input T of a first I/O circuit 120 receives the test data input signal. In the context of the FIG. 1 circuit implementation, the test data may be applied to the test input T of the first I/O circuit 120 of the memory circuit from the upstream shadow logic 14 or from the input scan chain register 40 or from the BIST circuit 18. The data output Q of the I/O circuit 120(0) is coupled to the test input T of a second I/O circuit 120(1). This connection configuration providing a scan chain is repeated across the M I/O circuits 120, with the test input T of a last I/O circuit 120M-(1) coupled to the data output Q of the next to last I/O circuit 120(M−2).

A drawback of the foregoing testing solution is that there is a need for additional testing-related circuitry to be provided in each I/O circuit 120. Furthermore, this solution does not support at-speed testing of the shadow logic surrounding the memory. This solution is not satisfactory for providing testing of a multi-port and multi-clock memory in connection with detecting at-speed transition faults.

Figure 7:
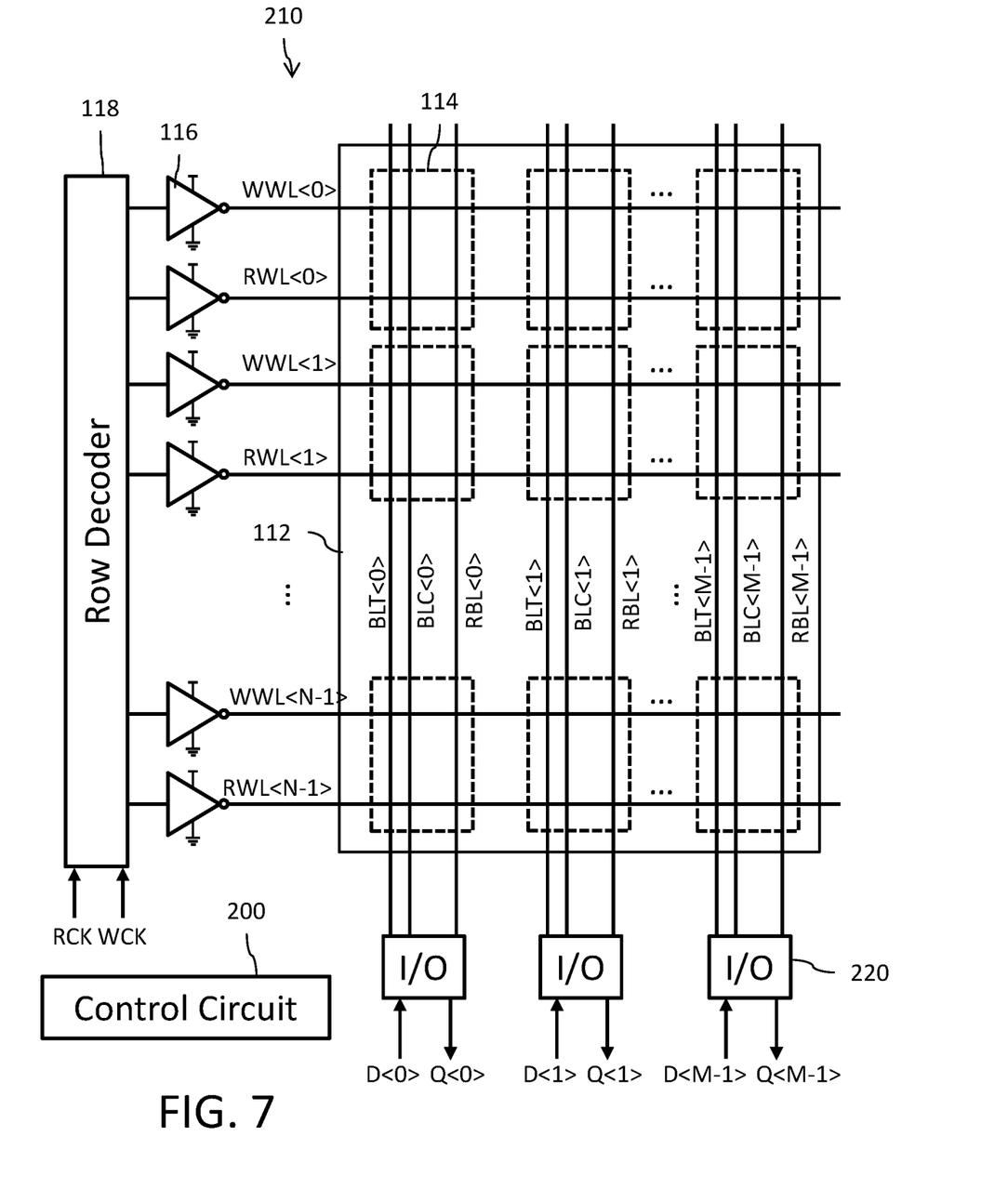
FIG. 7 is a block diagram of a memory circuit.

Reference is now made to FIG. 7 which shows a block diagram of a memory circuit 210. Like references in FIGS. 3 and 7 refer to same or similar components. The memory circuit 210 may, for example, be used as the memory circuit 12 in the system 10 shown in FIG. 1.

Figure 8:
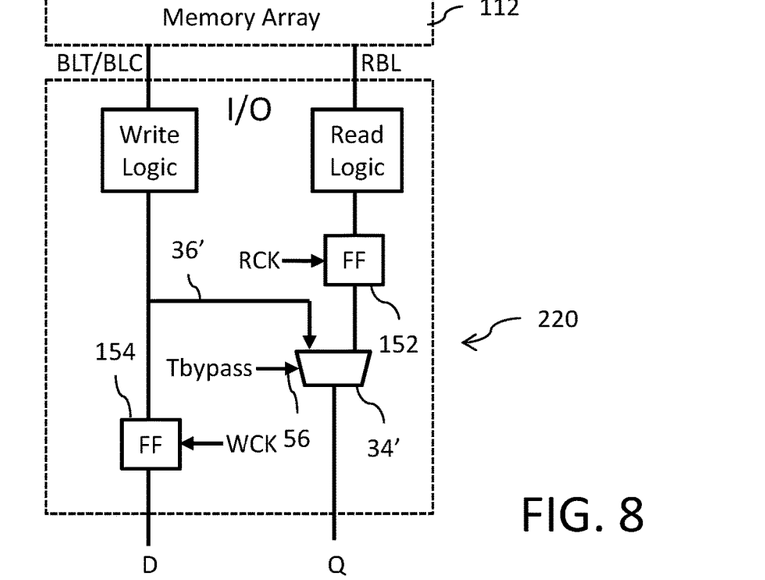
FIG. 8 is a block diagram of another embodiment for the I/O circuit for the memory circuit of FIG. 7.

The memory circuit 210 differs from the memory circuit 110 primarily in the configuration of the I/O circuit 220 as shown in FIG. 8. Each I/O circuit 220 includes a data input D (as part of the memory data input port data_in) and a data output Q (as part of the memory data output port data_out). A data output latch 152, for example formed by a flip-flop (FF), is coupled to the memory array of the memory circuit 210 to receive the data bit read by read logic circuitry from the memory array through the read bit line RBL. The data output latch 152 is controlled by a read clock signal RCK. Output from the data output latch 152 is applied to the first input of the multiplexer 34' whose output is coupled to the data output Q of the I/O circuit 220. A data input latch 154 is coupled to receive the data bit input to the memory circuit 210 at the data input D. The data input latch 154 is controlled by a write clock signal WCK. Output from the data input latch 154 is applied through write logic circuitry to write data into the memory array through the complementary write bit lines BLT, BLC. The output from the data input latch 154 is further applied over the bypass path 36' to the second input of the multiplexer 34' whose output is coupled to the data output Q of the I/O circuit 220. The selection input of the multiplexer 34' receives the test bypass (Tbypass) control signal 56. When the test bypass control signal 56 is asserted (for example, logic high), the multiplexer 34' selects the data at the second input of the multiplexer 34' (from latch 154 and bypass path 36') for output to the data output Q.

Advantageously, this testing solution supports stuck-at fault testing coverage for the memory and the shadow logic. However, transient testing coverage is not well supported. The reason for this is that the testing path through the data input latch 154, bypass path 36' and the second input of the multiplexer 34' to the data output Q is dependent on the write clock signal WCK during test mode selection. The test output signal from the data output Q, however, is captured in the read clock RCK domain and differences in clock frequency and clock skew (noting that WCK and RCK are asynchronous) precludes performance of transient fault testing. The issue is that the timing of the testing path through the data input latch 154 and the second input of the multiplexer 134 to the data output Q (dependent on the write clock WCK) cannot be made equal to timing of the read signal path from the memory array through the read logic, latch 152, first input of the multiplexer 34' to the data output Q (dependent on the read clock RCK).

Figure 9:
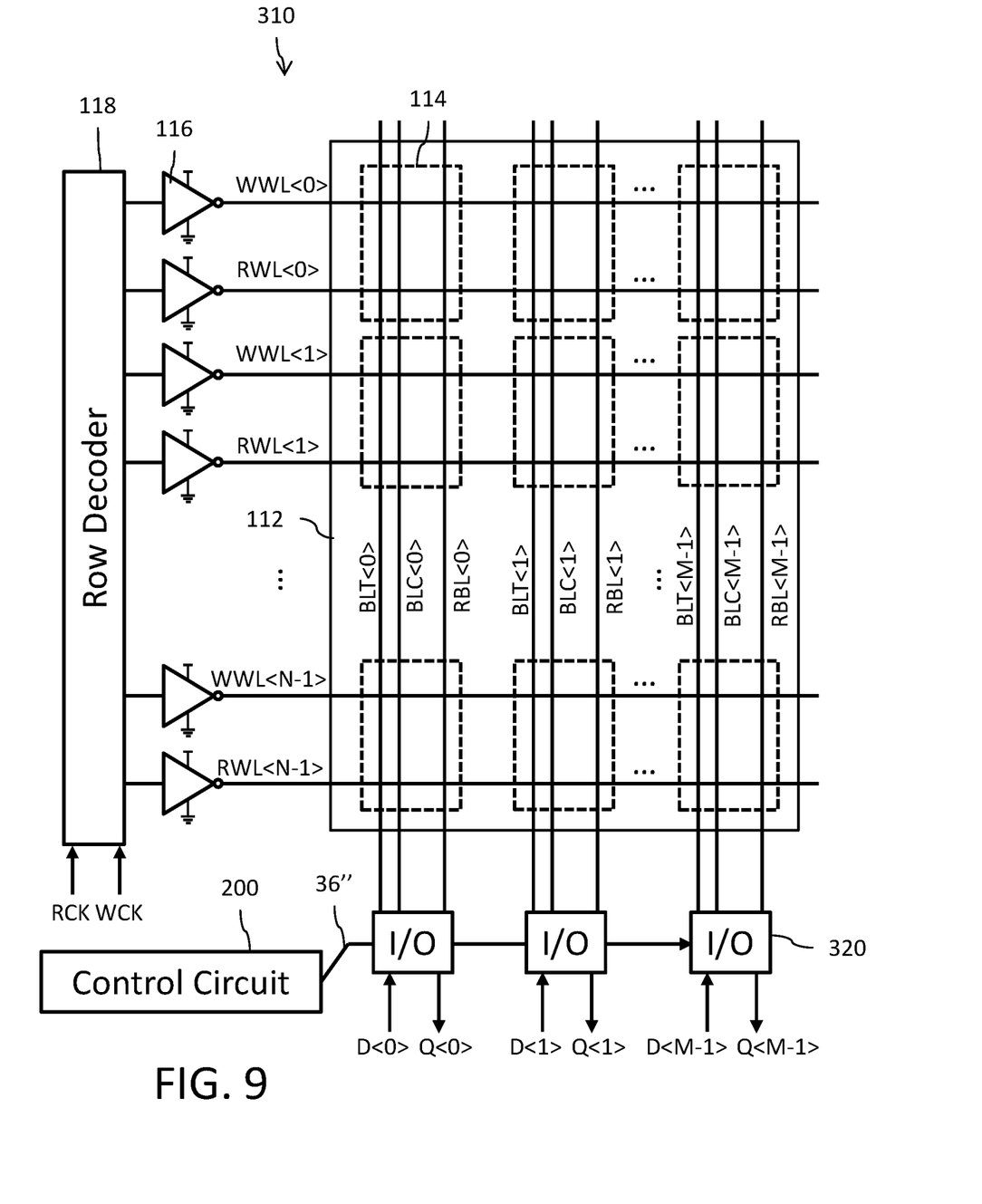
FIG. 9 is a block diagram of a memory circuit.

Reference is now made to FIG. 9 which shows a block diagram of a memory circuit 310. Like references in FIGS. 7 and 9 refer to same or similar components. The memory circuit 310 may, for example, be used as the memory circuit 12 in the system 10 shown in FIG. 1.

Figure 10:
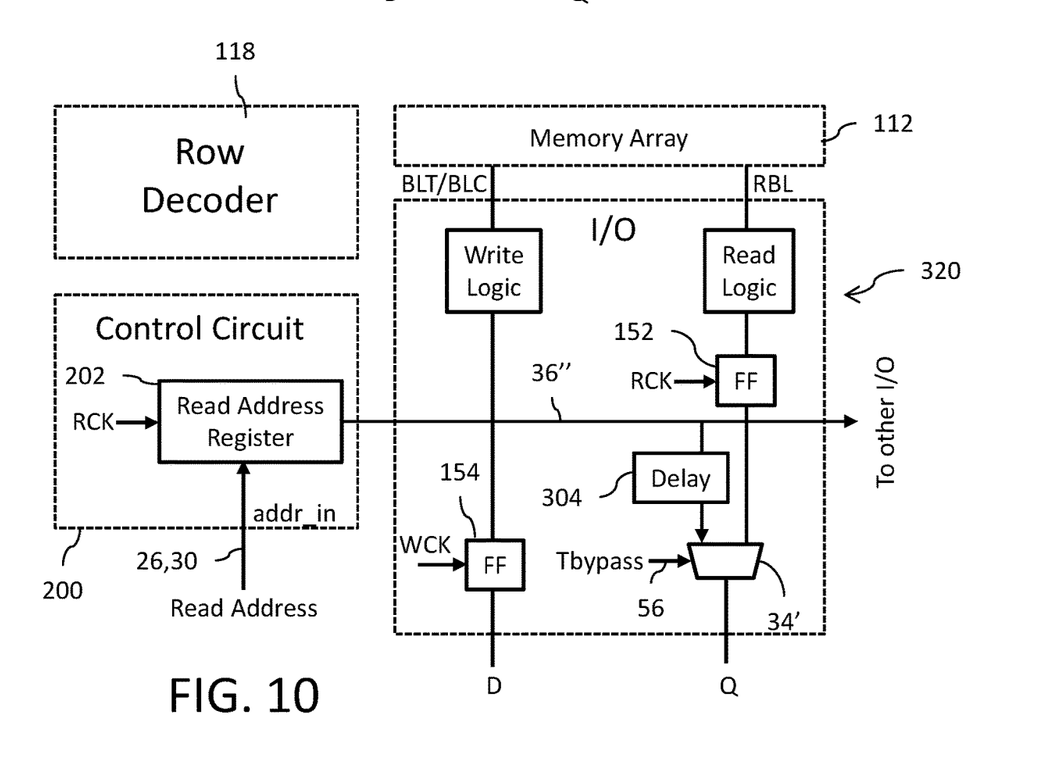
FIG. 10 is a block diagram of another embodiment for the I/O circuit for the memory circuit of FIG. 9.

The memory circuit 310 differs from the memory circuit 210 primarily in the configuration of the I/O circuit 320 as shown in FIG. 10. Each I/O circuit 320 includes a data input D (as part of the memory data input port data_in) and a data output Q (as part of the memory data output port data_out). A data output latch 152, for example formed by a flip-flop (FF), is coupled to the memory array of the memory circuit 310 to receive the data bit read by read logic circuitry from the memory array through the read bit line RBL. The data output latch 152 is controlled by a read clock signal RCK. Output from the data output latch 152 is applied to the first input of the multiplexer 34' whose output is coupled to the data output Q of the I/O circuit 320. A data input latch 154 is coupled to receive the data bit input to the memory circuit 310 at the data input D. The data input latch 154 is controlled by a write clock signal WCK. Output from the data input latch 154 is applied through write logic circuitry to write data into the memory array through the complementary write bit lines BLT, BLC. The second input of the multiplexer 34' is coupled to receive a test data bit from the output of a delay circuit 304. The input of the delay circuit 304 is coupled to the bypass path 36". It will be noted here, in the context of FIG. 1, that the bypass path 36" is instead between the address port (addr_in) of the memory circuit 12 and the memory data output port data_out.

The control circuit 200 of the memory circuit 310 includes a register 202 configured to latch a multi-bit read address (Read Address) applied to the address input (addr_in) in response to the read clock signal RCK. The bits of the latched read address are output from the register 202 during testing operation and supplied to the I/O circuits 320 over the bypass path 36". Each Read Address has B bits, where B<<M. With M I/O circuits 320(0) to 320(M−1), the B bits of the received and latched multi-bit read address are distributed over bypass path 36" to the I/O circuits 320 in accordance with a pattern. As an example, the M I/O circuits 320 are divided into M/B groups, and the B I/O circuits 320 of each group receive the corresponding B bits of the multi-bit read address (i.e., the B bits are supplied to the corresponding B I/O circuits 320(0) to 320(B−1), to the corresponding B I/O circuits 320(B) to 320(2B−1), . . . , and to the corresponding B I/O circuits 320(M−1−B) to 320(M−1)). At each I/O circuit 320, the delivered bit of the read address is applied to the input of the delay circuit 304, delayed by a delay time Δt (which may be unique in each I/O circuit or same across plural ones of the I/O circuits), and output to the second input of the multiplexer 34'. With the assertion (for example logic high) of the test bypass (Tbypass) control signal 56, the multiplexer 34' selects the delayed read address data bit at the second input of the multiplexer 34' for output to the data output Q of the I/O circuit 320. This delay time Δt can be controlled in each I/O circuit 320 using a logic delay or through an internal self-time delay.

In the context of the FIG. 1 circuit implementation, the read address may be applied to the address input (addr_in) of the memory circuit from the upstream shadow logic 14 (as multi-bit address data 26) through the first input of the multiplexer 28. Alternatively, the read address may be applied to the address input (addr_in) of the memory circuit from the BIST circuit 18 (as multi-bit address data 30) through the second input of the multiplexer 28. Test output data from the data outputs Q of the I/O circuits 320 may be passed through to the downstream shadow logic 16 and/or applied in feedback to the BIST circuit 18.

Advantageously, this testing solution supports stuck-at fault testing coverage for the shadow logic. Additionally, there is support for transient fault testing coverage as well. It will be noted that the testing path using the read address register 202 through the bypass path 36" and the second input of the multiplexer 34' to the data output Q is now dependent on the read clock signal RCK during test mode selection (and the applied delay Δt). The test output signal from the data output Q is likewise captured in the read clock RCK domain and so there are no differences in clock frequency and clock skew that would preclude performance of transient fault testing. By setting the delay time Δt implemented by the delay circuit 304, the timing of the testing path from the register 202 through the bypass path 36" and the second input of the multiplexer 34' to the data output Q can be controlled to be equal to the timing of the memory access read path from the read logic through latch 152 and the first input of the multiplexer 34' to the data output Q.

Figure 11:
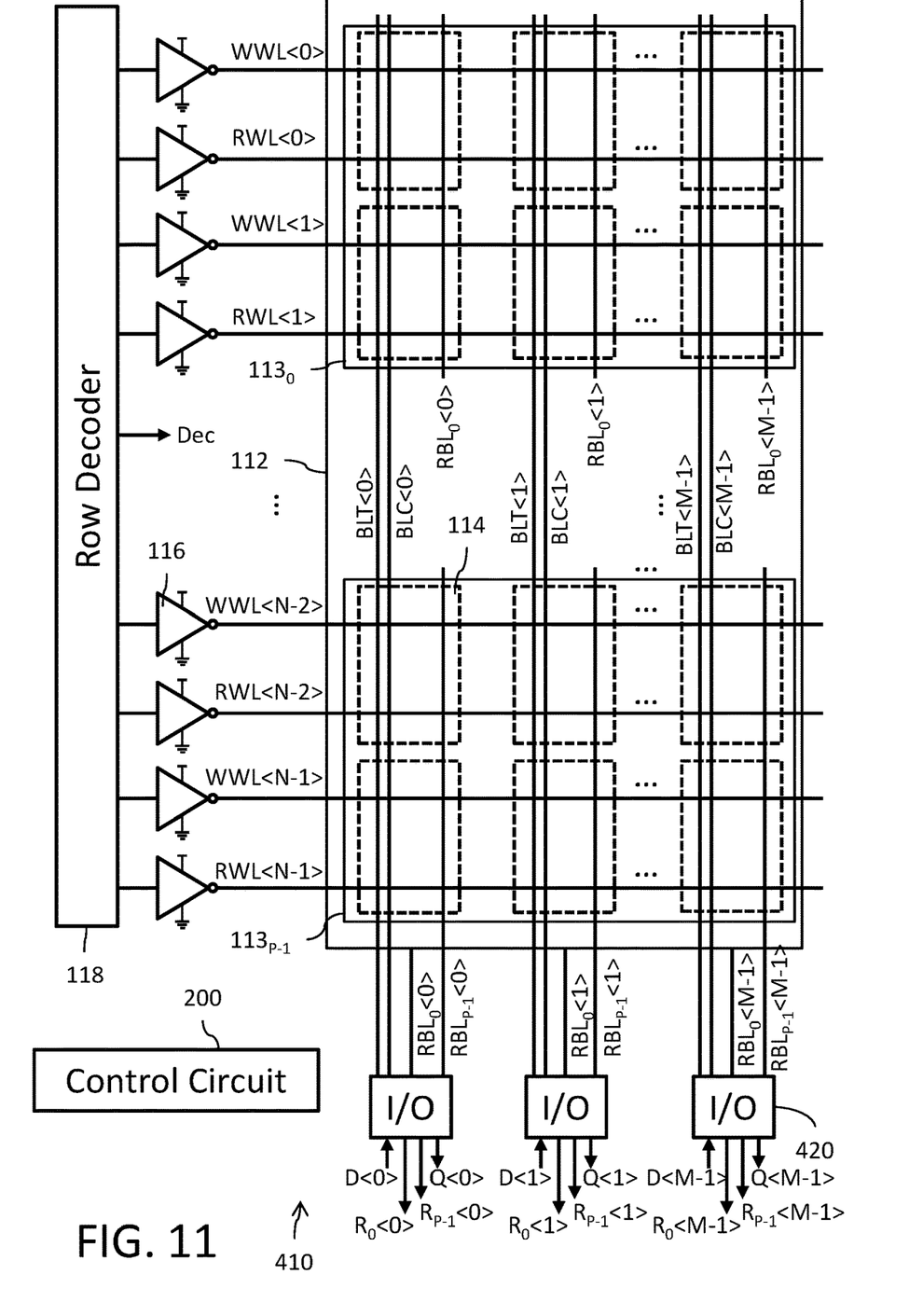
FIG. 11 is a schematic diagram of a memory circuit.

Reference is now made to FIG. 11 which shows a block diagram of a memory circuit 410. The circuit 410 includes a static random access memory (SRAM) array 112 formed by a plurality of SRAM memory cells 114 arranged in a matrix format having N rows and M columns. Each SRAM memory cell is of a well-known 8T-type (see, FIG. 4) and includes a write word line WWL, a pair of complementary bit lines BLT and BLC, a read word line RWL and a read bit line RBL. The SRAM memory cells in a common row of the matrix are connected to each other through a common write word line WWL and through a common read word line RWL. Each of the word lines (WL and/or RWL) is driven by a word line driver circuit 116 with a word line signal generated by a row decoder circuit 118 during read and write operations. The SRAM memory cells in a common column of the matrix across the whole array 112 are connected to each other through a common pair of complementary (write) bit lines BLT and BLC. The array 112 is segmented into P sub-arrays $113_0$ to $113_{P-1}$. Each sub-array 113 includes M columns and N/P rows of memory cells 114. The SRAM memory cells in a common column of each sub-array 113 are connected to each other through a local read bit line RBL. The P local read bit lines $RBL_0$<x> to $RBL_{P-1}$<x> from the sub-arrays 113 for the column x in the array 112 are coupled, along with the common pair of complementary bit lines BLT<x> and BLC<x> for the column x in the array 112, to a column input/output (I/O) circuit 420. A data input port (D) of the column I/O circuit 420 (provided as part of the memory data input port data_in) receives input data to be written to an SRAM memory cell 114 in the column through the bit lines BLT, BLC in response to assertion of a write word line signal. A data output port (Q) of the column I/O circuit 420 (provided as part of the memory data output port data_out) generates output data read from an SRAM memory cell 114 in the column through the read bit lines RBL in response to assertion of a read word line signal in a first read mode of operation. Additionally, the column I/O circuit 420 further includes P sub-array data output ports $R_0$ to $R_{P-1}$ to generate output data read from the memory cells 114 on the local read bit line RBL of the corresponding sub-array $113_0$ to $113_{P-1}$, respectively, in response to the simultaneous assertion of a plurality of read word line signals (one per sub-array 113) in a second read mode of operation. A control circuit 200 controls operations of the circuitry within the memory.

When the memory circuit 410 is operating in the first read mode of operation, the row decoder circuit 118 selectively actuates only one read word line RWL for the whole array 112 with a word line signal pulse to access a corresponding single one of the rows of memory cells 114. The logic state stored in the single accessed memory cell of a column is output to the read bit line RBL and input to the column I/O circuit 420 for output at the data output port Q. In this first mode of operation, the memory circuit 410 is configured for operation in manner same as with the memory circuit 310 of FIG. 9.

When the memory circuit 410 is operating in the second read mode of operation, the row decoder circuit 118 selectively (and simultaneously) actuates one read word line RWL in each sub-array 113 in the memory array 112 with a word line signal pulse to access a corresponding single one of the rows of memory cells 114 in each sub-array 113. The logic states stored in the single accessed memory cells for the sub-arrays 113 of each column are output to the read bit lines $RBL_0$ to $RBL_{P-1}$ and input to the column I/O circuit 420 for output at the corresponding sub-array data output ports $R_0$ to $R_{P-1}$.

This second read mode of operation, for example, may be implemented in connection with operation of the memory in support of the performance of an in-memory computation (where, for example, the memory cells 114 store bits of weight data and the word line signal pulses on the read word lines convey feature data). In this context, with reference to FIG. 1, the downstream (or output) shadow logic 16 may be configured to implement the multiply and accumulate (MAC) operation on the data output from the sub-array data output ports $R_0$ to $R_{P-1}$ of each column I/O circuit 420 for wide vector in-memory compute mode.

Figure 12:
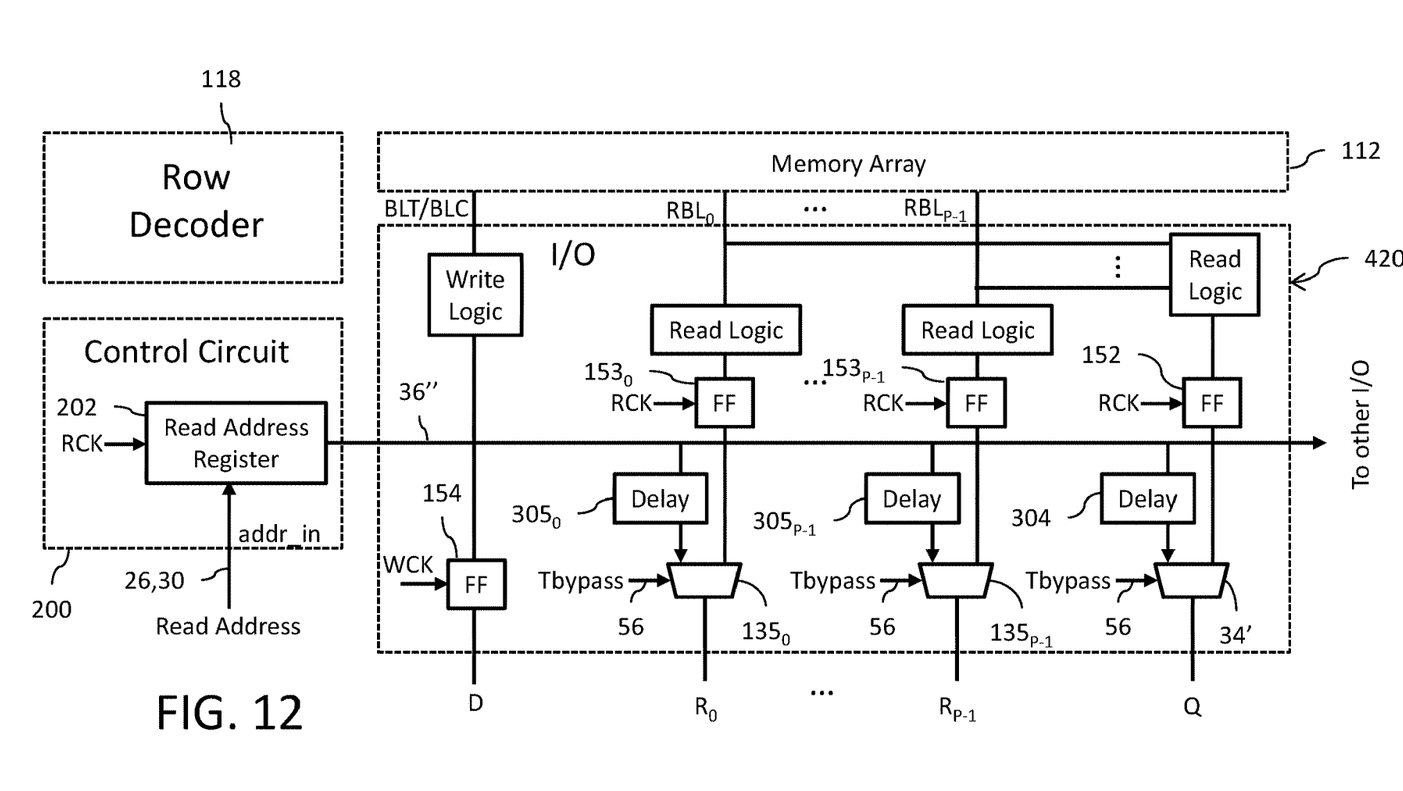
FIG. 12 is a block diagram of an embodiment for the I/O circuit for the memory circuit of FIG. 11.

A block diagram of an embodiment for the column I/O circuit 420 is shown in FIG. 12. A data output latch 152, for example formed by a flip-flop (FF), is coupled to the memory array of the memory circuit 410 in the first read mode of operation to receive the data bit read by read logic circuitry from the memory array through the read bit lines $RBL_0$ to $RBL_{P-1}$. The data output latch 152 is controlled by a read clock signal RCK. Output from the data output latch 152 is applied to the first input of the multiplexer 34' whose output is coupled to the data output Q of the I/O circuit 420. A data output latch $153_y$, for example formed by a flip-flop (FF), is coupled to the memory array of the memory circuit 410 in the second read mode of operation to receive the data bit read by read logic circuitry from the memory array through a corresponding one of the read bit lines $RBL_y$. Here, y=0 to P−1. The data output latch $153_y$ is controlled by the read clock signal RCK. Output from the data output latch $153_y$ is applied to the first input of the multiplexer $135_y$ whose output is coupled to the sub-array data output port $R_y$ of the I/O circuit 420. A data input latch 154 is coupled to receive the data bit input to the memory circuit 110 at the data input D. The data input latch 254 is controlled by a write clock signal WCK. Output from the data input latch 154 is applied through write logic circuitry to write data into the memory array through the complementary write bit lines BLT, BLC. The second input of the multiplexers 34', $135_y$ is coupled to receive a test data bit from the output of a delay circuit 304, $305_y$, respectively. The input of each delay circuit is coupled to the bypass path 36".

The control circuit 200 of the memory circuit 410 includes a register 202 configured to latch a multi-bit read address (Read Address) applied to the address input (addr_in) in response to the read clock signal RCK. The bits of the latched read addresses are output from the register 202 during testing operation and supplied over the bypass path 36" to the I/O circuits 420. Each Read Address has B bits, where B<<M. With M I/O circuits 420(0) to 420(M−1), the B bits of the received and latched multi-bit read address are distributed over bypass path 36' to the I/O circuits 420 in accordance with a pattern. As an example, the M I/O circuits 420 are divided into M/B groups, and the I/O circuits 420 of each group receive the B bits of the multi-bit read address (i.e., the B bits are supplied to B I/O circuits 420(0) to 420(B−1), supplied to B I/O circuits 420(B) to 420(2B−1), . . . , and supplied to B I/O circuits 420(M−1-B) to 420(M−1)). At each I/O circuit 420, the delivered bit of the read address is applied to the input of the delay circuit 304, delayed by a delay time Δt (which may be unique in each I/O circuit or same across plural ones of the I/O circuits), and output to the second input of the multiplexer 34'. With the assertion (for example logic high) of the test bypass (Tbypass) control signal 56, the multiplexer 34' selects the delayed read address data bit at the second input of the multiplexer 34' for output to the data output Q of the I/O circuit 420. This delay time Δt can be controlled in each I/O circuit 420 using a logic delay or through an internal self-time delay.

With M I/O circuits 420(0) to 420(M−1) and each I/O circuit 420 including P sub-array data output ports $R_0$ to $R_{P-1}$, the B bits of the received and latched multi-bit read address are distributed over bypass path 36" to the I/O circuits 420 in accordance with a pattern. As an example, the M I/O circuits 420 are divided into M/B groups, and the I/O circuits 420 of each group receive the B bits of the multi-bit read address (i.e., the B bits are supplied to I/O circuits 420(0) to 420(B−1), to I/O circuits 420(B) to 420(2B−1), . . . , and to I/O circuits 420(M−1-B) to 420(M−1)). At each I/O circuit 420, the delivered bit of the read address is applied to the input of each of the P delay circuits $305_y$, delayed by a delay time Δt (which may be unique in each I/O circuit or same across plural ones of the I/O circuits), and output to the second input of the multiplexers $135_y$. With the assertion (for example logic high) of the test bypass (Tbypass) control signal 56, the multiplexers $135_y$ select the delayed read address data bit at the second input of the multiplexer $135_y$ for output to the corresponding sub-array data output port $R_y$ of the I/O circuit 420. This delay time Δt can be controlled in each I/O circuit 420 using a logic delay or through an internal self-time delay.

In the context of the FIG. 1 circuit implementation, the read address may be applied to the address input (addr_in) of the memory circuit from the upstream shadow logic 14 (as multi-bit address data 26) through the first input of the multiplexer 28. Alternatively, the read address may be applied to the address input (addr_in) of the memory circuit from the BIST circuit 18 (as multi-bit address data 30) through the second input of the multiplexer 28. Test output data from the data outputs Q and/or the sub-array data output ports $R_y$ of the I/O circuits 420 may be passed through to the downstream shadow logic 16 and/or applied in feedback to the BIST circuit 18.

Advantageously, this testing solution supports stuck-at fault testing coverage for the memory and the shadow logic. Additionally, there is support for transient fault testing coverage as well. It will be noted that the testing path using the read address register 202 through the second input of the multiplexers $135_y$ to the data outputs $R_y$ is now dependent on the read clock signal RCK during test mode selection (and the applied delay Δt). The test output signal from the data outputs $R_y$ is likewise captured in the read clock RCK domain and so there are no differences in clock frequency and clock skew that would preclude performance of transient fault testing. By setting the delay time Δt implemented by the delay circuits $305_y$, the timing of the testing path from the register 202 through the bypass path 36" and the second input of the multiplexers $135_y$ to the sub-array data output ports $R_y$ can be controlled to be equal to the timing of the memory access read path from the read logic through latches $153_y$ and the first input of the multiplexers $135_y$ to the sub-array data output ports $R_y$.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. An integrated circuit system, comprising:
   a memory circuit having: a memory array, a control circuit coupled to an address port, and input/output circuits coupled to a data input port and a data output port;
   wherein the control circuit includes an address register configured to latch a read address in response to a read clock;
   wherein each input/output circuit includes a first data path controlled by a write clock and coupling a data input of the data input port to a write bit line of the memory array and a second data path controlled by the read clock and coupling a read bit line of the memory array to a data output of the data output port;
   wherein the second data path in each input/output circuit comprises a multiplexer circuit having a first input coupled to the read bit line, a second input coupled to a bypass path and an output coupled to the data output;
   wherein a test bit is applied responsive to the read clock to the second input of the multiplexer in each input/output circuit; and
   wherein the multiplexer is controlled to select the second input during a testing operation.

2. The integrated circuit system of claim 1, wherein the memory array of the memory circuit comprises memory cells having separate read ports and write ports.

3. The integrated circuit system of claim 1, wherein the second data path in each input/output circuit comprises a latch circuit configured to latch data from the read bit line of the memory array in response to the read clock.

4. The integrated circuit system of claim 1, wherein the test bit is an address bit of the read address latched in the address register in response to the read clock.

5. The integrated circuit system of claim 3, wherein said bypass path includes a delay circuit configured to delay application of the address bit of the read address to the second input of the multiplexer in each input/output circuit by a delay time.

6. The integrated circuit system of claim 5, wherein the delay time is set so that timing of test signal propagation from the register through the bypass path and the second input of the multiplexer to the data output is equal to the timing of memory access for read from the memory array through the second data path.

7. The integrated circuit system of claim 4, further comprising shadow logic upstream of the address port, wherein said shadow logic provides the read address during the testing operation.

8. The integrated circuit system of claim 7, further comprising a scan register for the testing operation coupled to the shadow logic upstream of the data input port.

9. The integrated circuit system of claim 4, further comprising a built-in self test (BIST) circuit configured to supply the read address during the testing operation.

10. The integrated circuit system of claim 9, wherein the BIST circuit is further coupled to the data output port.

11. The integrated circuit system of claim 1, further comprising shadow logic downstream of the data output port.

12. The integrated circuit system of claim 11, further comprising a scan register for the testing operation coupled to the shadow logic downstream of the data output port.

13. The integrated circuit system of claim 1, further comprising shadow logic upstream of the data input port.

14. The integrated circuit system of claim 13, further comprising a scan register for the testing operation coupled to the shadow logic upstream of the data input port.

15. The integrated circuit system of claim 1, wherein the read clock and the write clock are asynchronous.

16. The integrated circuit system of claim 1, wherein the read clock and the write clock have different frequencies.

17. The integrated circuit system of claim 1, wherein the memory array is divided into a plurality of sub-arrays, each sub-array including a local read bit line, and wherein each input/output circuit comprises read logic having inputs coupled to the local read bit lines from the plurality of sub-arrays and an output coupled to the second data path.

18. The integrated circuit system of claim 17, wherein each input/output circuit further comprises a plurality of further data paths, each further data path coupling one of the plurality of local read bit lines to a corresponding one of a plurality of read data outputs of the data output port.

19. The integrated circuit system of claim 18:
   wherein the test bit is an address bit of the read address latched in the address register in response to the read clock;
   wherein each further data path in each input/output circuit comprises a further multiplexer circuit having a first input coupled to the local read bit line, a second input coupled to the bypass path and an output coupled to the read data output;
   wherein the address bit of the read address latched in the address register is applied to the second input of the further multiplexers in each input/output circuit; and
   wherein the further multiplexers are controlled to select the second input during the testing operation.

20. The integrated circuit system of claim 19, wherein the second data path in each input/output circuit comprises a latch circuit configured to latch data from the read bit line of the memory array in response to the read clock.

21. The integrated circuit system of claim 19, wherein said bypass path includes a delay circuit configured to delay application of the address bit of the read address to the second input of the further multiplexers in each input/output circuit by a delay time.

22. The integrated circuit system of claim 21, wherein the delay time is set so that timing of test signal propagation from the register through the bypass path and the second input of the further multiplexers to the read data outputs is equal to the timing of memory access for read from the memory array through the second data path.

23. The integrated circuit system of claim 19, further comprising shadow logic downstream of the data output port.

24. The integrated circuit system of claim 23, further comprising a scan register for the testing operation coupled to the shadow logic downstream of the data output port.

25. The integrated circuit system of claim 19, further comprising shadow logic upstream of the data input port.

26. The integrated circuit system of claim 25, further comprising a scan register for the testing operation coupled to the shadow logic upstream of the data input port.

27. The integrated circuit system of claim 19, further comprising shadow logic upstream of the address port, wherein said shadow logic provides the read address during the testing operation.

28. The integrated circuit system of claim 27, further comprising a scan register for the testing operation coupled to the shadow logic upstream of the data input port.

29. The integrated circuit system of claim 19, further comprising a built-in self test (BIST) circuit configured to supply the read address during the testing operation.

30. The integrated circuit system of claim 29, wherein the BIST circuit is further coupled to the data output port.

31. The integrated circuit system of claim 19, wherein the read clock and the write clock are asynchronous.

32. An integrated circuit system, comprising:
- a memory circuit an address port, a data input port and a data output port;
- an upstream shadow logic circuit coupled to provide address data to the address port of the memory circuit and input data to the data input port of the memory circuit; and
- a downstream shadow logic circuit coupled to receive output data from the data output port of the memory circuit;
- wherein the memory circuit includes a bypass path between the address port and the data output port, said bypass path being active during a testing operation to pass bits of the address data applied by upstream shadow logic circuit from the address port to the data output port.

33. The integrated circuit system of claim 32, wherein the bypass path includes a delay circuit configured to delay passage of the bits of address data from the address port to the data output port.

34. The integrated circuit system of claim 33, wherein the delay time is set so that timing of address bit propagation from the address port through the bypass path to the data output port is equal to timing of memory access for reading data from the memory circuit for output at data output port.

35. The integrated circuit system of claim 32, further comprising a scan register for the testing operation coupled to the downstream shadow logic.

36. The integrated circuit system of claim 32, further comprising a scan register for the testing operation coupled to the upstream shadow logic.

37. The integrated circuit system of claim 32, wherein the memory circuit includes a memory array with a read bit line coupled to the data output port through a read path.

38. The integrated circuit system of claim 37, wherein said read path comprises:
- a latch circuit configured to latch data from the read bit line of the memory array in response to the read clock; and
- a multiplexer circuit having a first input coupled to an output of the latch circuit, a second input coupled to the bypass path and an output coupled to the data output port; and
- wherein the multiplexer is controlled to select the second input during the testing operation.

39. The integrated circuit system of claim 32, wherein the memory circuit includes a memory array divided into a plurality of sub-arrays, each sub-array including a local read bit line coupled to the data output portion through a read path.

40. The integrated circuit system of claim 39, wherein each read path comprises:
- a latch circuit configured to latch data from the local read bit line of the memory array in response to the read clock; and
- a multiplexer circuit having a first input coupled to an output of the latch circuit, a second input coupled to the bypass path and an output coupled to the data output port; and
- wherein the multiplexer is controlled to select the second input during the testing operation.

* * * * *